T862013

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection ; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED MAY 27, 1969

862 O.G. 1009

782,001
COATING PROCESS

Richard L. Wagner, Wilmington, Del., assignor to Hercules Incorporated, Wilmington, Del., a corporation of Delaware

Continuation of application Ser. No. 513,120, Dec. 10, 1965. This application Dec. 6, 1968. Published May 27, 1969
Int. Cl. B29c *1/14;* B29h *8/00;* B32b *27/00*
U.S. Cl. 264—129
No Drawing. 15 Pages Specification

This disclosure relates to a process for improving the adhesion of organic coatings to plastic articles. A microscopic surface roughness is replicated onto the surface of a plastic by molding the plastic in a metal mold the surface of which has been microscopically roughened. The roughened surface of the resulting molded plastic is then coated with an organic coatings system. The disclosed process results in excellent adhesion of various organic coatings systems to plastic surfaces to which they may not otherwise be adherent.